(12) United States Patent
Hampton et al.

(10) Patent No.: US 8,802,780 B2
(45) Date of Patent: Aug. 12, 2014

(54) CROSSLINKABLE BLEND FOR THE PRODUCTION OF A LAYERED ARTICLE

(75) Inventors: Nigel Hampton, Peachtree City, GA (US); Annika Smedberg, Myggenäs (SE)

(73) Assignee: Borealis Technology Oy, Porvoo (FI)

( * ) Notice: Subject to any disclaimer, the term of this patent is extended or adjusted under 35 U.S.C. 154(b) by 220 days.

(21) Appl. No.: 12/735,226

(22) PCT Filed: Dec. 17, 2008

(86) PCT No.: PCT/EP2008/067726
§ 371 (c)(1),
(2), (4) Date: Jun. 23, 2010

(87) PCT Pub. No.: WO2009/083453
PCT Pub. Date: Jul. 9, 2009

(65) Prior Publication Data
US 2010/0292404 A1 Nov. 18, 2010

(30) Foreign Application Priority Data
Dec. 28, 2007 (EP) ..................... 07124168

(51) Int. Cl.
*C08L 23/00* (2006.01)
*C08L 23/04* (2006.01)
*C08F 8/00* (2006.01)

(52) U.S. Cl.
USPC ........... 525/240; 525/191; 525/222; 525/232; 428/523

(58) Field of Classification Search
USPC ........................................ 525/240
See application file for complete search history.

(56) References Cited

U.S. PATENT DOCUMENTS

| 4,342,844 A | 8/1982 | Torenbeek et al. |
| 4,737,547 A | 4/1988 | White |
| 5,516,845 A | 5/1996 | Heese et al. |
| 7,803,860 B2 * | 9/2010 | Smedberg et al. ............ 524/313 |

FOREIGN PATENT DOCUMENTS

| EP | 0 459 208 | | 7/1998 |
| EP | 1 150 917 | | 11/2001 |
| EP | 1 695 992 | | 8/2006 |
| EP | 1695992 | * | 8/2006 |
| EP | 1 731 564 | | 12/2006 |
| EP | 1 731 566 | | 12/2006 |
| EP | 1731565 | * | 12/2006 |
| EP | 1731565 A1 | | 12/2006 |
| EP | 1731566 | * | 12/2006 |
| WO | WO 93/08222 | | 4/1993 |
| WO | WO 2004/087804 | | 10/2004 |

OTHER PUBLICATIONS

Viksne et al.; "Adhesion of Modified PE/EPDM Blends to Steel"; Journal of Macromolecular Science, A Pure and Applied Chemistry; Jan. 1, 1998; pp. 1165-1185; XP008067561, issue No. 1060-1325; Marcel Dekker, USA.

* cited by examiner

*Primary Examiner* — Irina Krylova
(74) *Attorney, Agent, or Firm* — Warn Partners, P.C.

(57) ABSTRACT

The present invention relates to a process for the preparation of an article, comprising the following steps: (a) providing a component (i) which comprises a blend of (a1) an unsaturated first polyolefin having a certain total amount m1 of carbon-carbon double bonds/1000 carbon atoms, (a2) a crosslinking agent, (a3) optionally an unsaturated low molecular weight compound having a certain total amount m2 carbon-carbon double bonds/1000 carbon atoms, (b) providing a component (ii) which comprises a second polymer having a certain total amount m3 of carbon-carbon double bonds/1000 carbon atoms, wherein m1, m2 and m3 satisfy a certain relationship, (c) forming a blend of component (i) and component (ii) wherein the weight ratio of the component (i) to the component (ii) is within the range of 10:90 to 99:1, (d) applying one or more layers of the blend onto a substrate.

27 Claims, 1 Drawing Sheet

CROSSLINKABLE BLEND FOR THE PRODUCTION OF A LAYERED ARTICLE

This application is a National Stage of International Application No. PCT/EP2008/067726, filed Dec. 17, 2008. This application claims priority to European Patent Application No. 07124168.1 filed on Dec. 28, 2007. The disclosures of the above applications are incorporated herein by reference.

The present invention relates to a crosslinkable blend, a process for its preparation, and its use in the production of a layered article, in particular a power cable.

Electric cables and wires are generally composed of one or more polymer layers extruded around an electric conductor. In medium (between 6 kV to 36 kV) and high voltage (more than 36 kV) power cables, the electric conductor is usually coated first with an inner semi-conducting layer, followed by an insulating layer and an outer semi-conducting layer. To these layers, further layers may be added, such as screen or auxiliary barrier layer(s), e.g. one or more water barrier layer(s) and one or more jacketing layer(s).

The insulating and semi-conducting layers in a cable are normally made of a polymer composition comprising a crosslinked polyolefin. By crosslinking the polymer, properties such as heat resistance, especially at elevated temperatures, mechanical strength, chemical, and abrasion can be improved.

Common polymeric materials for wire and cable applications comprise ethylene homo- and/or copolymers and propylene homo- and/or copolymers. Crosslinked low density polyethylene (LDPE) is today the predominant cable insulating material for power cables.

Cross-linking can be effected by adding free-radical forming agents like peroxides to the polymeric material prior to extrusion of the cable. The free-radical forming agent should preferably remain stable during extrusion performed at a temperature low enough to minimize the early decomposition of the peroxide but high enough to obtain proper melting and homogenisation. Furthermore, the crosslinking agent should decompose in a subsequent cross-linking step at elevated temperature. If a significant amount of peroxide already decomposes in the extruder, thereby initiating premature crosslinking, this will result in the formation of so-called "scorch", i.e. inhomogeneity, surface uneveness and possibly discolouration in the different layers of the resultant cable. Thus, any significant decomposition of free-radical forming agents during extrusion should be avoided. On the other hand, thermal treatment of the extruded polyolefin layer should result in high crosslinking speed and high crosslinking efficiency.

The degree of crosslinking can be expressed inter alia in terms of the hot set elongation value, i.e. the elongation of the crosslinked polymer under a specified load at a temperature of 200° C. The higher the degree of crosslinking, the lower is the hot set value. Typically, a hot set elongation of max 175% when measured according to IEC60811-2-1 at 0.2 MPa load, 200° C. is the maximum acceptable in industrial production. The degree of crosslinking can also be expressed in terms of permanent deformation. Any increase of process flexibility or any improvement in process efficiency, such as lower production costs, should still enable the manufacture of polymeric materials which meet the hot set elongation permanent deformation requirements mentioned above.

At present, blending of the polymer and the crosslinking agent such as peroxide is accomplished in different ways.

The unsaturated first polyolefin and the crosslinking agent can be blended by any conventional mixing process so as to provide the component (i). Exemplary mixing procedures might include melt mixing, e.g. in an extruder, as well as adsorption of peroxide in liquid form or a peroxide solution on the polymer.

Such technique is described in EP1150917 of Pirelli, only as an example. The polymer, which is typically in form of pellets, that already contains crosslinking agent before the polymer/pellets are used by producers of polymeric articles, e.g. cables, is very feasible for end users, since the demanding step of adding crosslinking agent during the cable production can be avoided.

Thus the addition of crosslinking agent is also possible to perform during the cable manufacture production by adding said agent to the pellets in a separate mixing device preceding the extruder or to the polymer melt in the cable extruder. The addition of crosslinking agent during the cable manufacturing process is generally referred to as direct peroxide injection (DPI technique). Some peroxides that are commonly used for crosslinking of polymers are in liquid form or have such a low melting point that they melt upon being mixed into the polymer as a result of frictional heat or elevated mixing temperature. This complicates the mixing step in that the peroxide flows away and/or lubricates the polymer, thereby resulting in polymeric material which escapes the mixing action, resulting in a non-uniform distribution of the crosslinking agent or that it is not simply possible to incorporate the correct amount needed to fulfill the requirements for the degree of crosslinking. However, as direct peroxide injection requires a lot of efforts by the cable producers to keep control over all components to be injected, a simpler and more reliable alternative is desired.

As an alternative to direct peroxide injection, polymer master batches containing a high amount of crosslinking agent have been used. The master batch is then mixed with a second polymer in the extruder.

U.S. Pat. No. 4,342,844 discloses a process for the preparation of a master batch containing 20 to 60 wt % of an organic peroxide and 40 to 80 wt % of a crosslinkable polymer such as an ethylene copolymer.

EP 0 459 208 discloses a concentrate of non-extruded polymer particles having a porosity of at least 15% and comprising about 5 to 50 wt % of an additive such as a peroxide.

U.S. Pat. No. 5,516,845 discloses melt-mixing of 0.1 to 25 wt % of a porous carrier polymer, such as polyethylene, containing 5 to 80 wt % of peroxide, with a basic polymer material, preferably made of the same polymer as the porous carrier polymer.

However, as master batches include a high amount of peroxide, it follows that high local concentrations of peroxide will be generated when blending these master batches with a base polymer. Therefore an adequate distribution of peroxide is necessary, but may be difficult to achieve. As a consequence thereof, premature crosslinking is more likely to occur in these areas of high peroxide concentration. Furthermore, the higher the concentration of peroxide in a masterbatch the higher the risk that the peroxide will be lost due to e.g. evaporation and/or due to limited solubility of peroxide in the polymer material.

U.S. Pat. No. 4,737,547 discloses a physical admixture of a major portion of particles of an ethylene polymer with a minor portion of particles of a composition of an ethylene polymer and crosslinking agent. If the crosslinking agent is an organic peroxide, it is preferred that less than 4 wt % of peroxide are present in the minor polymer portion.

The crosslinking power or crosslinkability of a polymer can be increased by introducing double bonds to the polymer. Such technique has been disclosed i.a. in WO 93/08222 in combination with a peroxide for the production of a crosslinked insulation layer in a power cable.

Considering the drawbacks of the prior art discussed above, it is an object of the present invention to provide a cost-effective process of high flexibility for the preparation of a crosslinkable composition which still results in a high degree of crosslinking when treated under crosslinking conditions. In other words, economical benefits and improvement of process flexibility should not be achieved on the expense of crosslinking efficiency. Furthermore, it is desired that the new process still enables to implement other relevant properties like acceptable wet ageing resistance and/or low scorch.

BRIEF DESCRIPTION OF THE SEVERAL VIEWS OF THE DRAWINGS

The present invention will become more fully understood from the detailed description and the accompanying drawings, wherein.

The object outlined above is solved by providing a process for the preparation of an article, comprising the following steps:
(a) providing a component (i) which comprises a blend of
(a1) an unsaturated first polyolefin having a total amount $m1$ of carbon-carbon double bonds/1000 carbon atoms of >0,
(a2) a crosslinking agent,
(a3) optionally an unsaturated low molecular weight compound having a molecular weight of less than 1000 g/mole and a total amount $m2$ of carbon-carbon double bonds/1000 carbon atoms of >0,
(b) providing a component (ii) which comprises
(b1) a second polymer having a total amount $m3$ of carbon-carbon double bonds/1000 carbon atoms of ≥0,
(b2) optionally an unsaturated low molecular weight compound having a molecular weight of less than 1000 g/mole and a total amount $m4$ of carbon-carbon double bonds/1000 carbon atoms of >0
wherein $m1$, $m2$, $m3$ and $m4$ satisfy the following relationship:

$$(m1+m2)-(m3+m4) \geq -3.0,$$

$m2$ and/or $m4$ being 0 if the unsaturated low molecular weight compound(s) (a3) and/or (b2) is/are not present,
and the component (i) is different from component (ii);
(c) forming a blend of component (i) and component (ii) wherein the weight ratio of the component (i) to the component (ii) is within the range of 10:90 to 99:1,
(d) forming an article which comprises the blend obtained in step (c).

A preferred embodiment of the process of the invention provides a process for the preparation of a layered article, comprising the following steps:
(a) providing a component (i) which comprises a blend of
(a1) an unsaturated first polyolefin having a total amount $m1$ of carbon-carbon double bonds/1000 carbon atoms of >0,
(a2) a crosslinking agent,
(a3) optionally an unsaturated low molecular weight compound having a molecular weight of less than 1000 g/mole and a total amount $m2$ of carbon-carbon double bonds/1000 carbon atoms of >0,
(b) providing a component (ii) which comprises
(b1) a second polymer having a total amount $m3$ of carbon-carbon double bonds/1000 carbon atoms of ≥0,
(b2) optionally an unsaturated low molecular weight compound having a molecular weight of less than 1000 g/mole and a total amount $m4$ of carbon-carbon double bonds/1000 carbon atoms of >0,
wherein $m1$, $m2$, $m3$ and $m4$ satisfy the following relationship:

$$(m1+m2)-(m3+m4) \geq -3.0,$$

$m2$ and/or $m4$ being 0 if the unsaturated low molecular weight compound(s) (a3) and/or (b2) is/are not present, and
the first component (i) is different from component (ii);
(c) forming a blend of component (i) and component (ii) wherein the weight ratio of the component (i) to the component (ii) is within the range of 10:90 to 99:1,
(d) applying one or more layers of the blend from step (c) onto a substrate.

A preferred embodiment of the process of the invention provides a process for the preparation of an article, preferably a layered article such as a power cable, wherein the component (ii) does not comprise the unsaturated low molecular weight compound (b2). As indicated above and in further detail below, absence of the unsaturated low molecular weight compound (b2) in component (ii) means that $m4=0$.

Preferably, the unsaturated first polyolefin (a1) of component (i) is different from the second polymer (b1) of component (ii).

Herein, the expression "the component (i) is different from component (ii)" and "the unsaturated first polyolefin (a1) is different from the second polymer (b1) of component (ii)", respectively, means that they are as such different in at least one property including the type and the amount of double bonds or have a different composition.

The determination method for calculating the total amount $m1$ and $m3$ is described in details later under "Measuring methods". The total amount $m2$ and $m4$, respectively, is determined in a formulation with a polymer matrix and expressed as "per 1000 carbon atoms" as described in details later under "Measuring methods".

With respect to the unsaturated first polyolefin (a1) of component (i) and the second polymer (b1) of component (ii), the term "total amount of carbon-carbon double bonds" refers to those double bonds originating from vinyl groups, vinylidene groups and trans-vinylene groups. The polymers in component (i) and (ii) that can be used in the process of the present invention do not necessarily contain all types of double bonds mentioned above. However, if so, they all contribute to the "total amount of carbon-carbon double bonds".

As will be described below in further detail, the component (i), i.e. a blend of the first polyolefin (a1), the crosslinking agent (a2) and optionally the unsaturated low molecular weight compound (a3), and the component (ii) are prepared separately, e.g. in the form of pellets, and these components (i) and (ii) which have been prepared separately, are subsequently blended in a mixing step preceding or during the preparation process of an article of the invention, e.g. in an extruder of a cable-making device. Thus components (i) and (ii) are provided separately, steps (a) and (b) can be carried out in any sequence, i.e. step (a) first or step (b) first or both steps simultaneously. Accordingly, component (i) could also be designated as a premixture (or "premix") already including a blend of an unsaturated first polyolefin and a crosslinking agent before being blended with the second polymer of component (ii) preceding or during mixing in an extruder, e.g. of a cable-producing line, where it is mixed with a second polymer. If the component (ii) includes optional additives in addition to the second polymer, it could be designated as a pre-mixture (or "premix") as well.

Component (i)

Preferably, the total amount m1 of carbon-carbon double bonds/1000 carbon atoms of the unsaturated first polyolefin is at least 0.10. Upper limit of said m1 of carbon-carbon double bonds/1000 carbon atoms is not critical and can be typically up to 3.0, preferably up to 2.5. Preferably the total amount of m1 of carbon-carbon double bonds/1000 carbon atoms is between the range 0.2 to 2.0, more preferably 0.3 to 2.0.

As indicated above, the total amount m1 of double bonds is the sum of the amount of vinyl groups (referred in the following as n1), the amount of vinylidene groups and the amount of trans-vinylene groups of the unsaturated first polyolefin.

In a preferred embodiment, the unsaturated first polyolefin has a total amount n1 of vinyl groups/1000 carbon atoms of at least 0.03. Upper limit of said n1 of vinyl groups/1000 carbon atoms is not critical and can be typically up to 2.5, preferably up to 2.2. Preferably the total amount of n1 of vinyl groups/1000 carbon atoms is between the range 0.1 to 2.0, more preferably 0.2 to 2.0. Of course, if vinyl groups are present, the amount of these vinyl groups does not exceed the total amount of double bonds but is preferably lower.

In general, "vinyl group" means herein $CH_2=CH-$ moiety which can be present in the unsaturated first polyolefin (a1), but also, as described further below, in the unsaturated low molecular weight compound (a3) and the second polymer of component (ii).

Two types of vinyl groups can be differentiated in the polymers. One type of vinyl group is generated by the polymerisation process (e.g. via a scission reaction of a secondary radical) or results from the use of chain transfer agents introducing vinyl groups. Another type of vinyl group may originate from a polyunsaturated comonomer which may be used for the preparation of the unsaturated polyolefin, as will be described later in greater detail.

In the present invention, the unsaturated first polyolefin (a1) is preferably an unsaturated polyethylene or an unsaturated polypropylene. Most preferably, the unsaturated first polyolefin (a1) is an unsaturated polyethylene. In a preferred embodiment, the unsaturated polyethylene contains at least 60 wt-% ethylene monomer units. In other preferred embodiments, the unsaturated polyethylene contains at least 70 wt-%, at least 80 wt-% or at least 90 wt-% ethylene monomer units. Unsaturated polyethylene of low density is preferred.

In a preferred embodiment, the unsaturated first polyolefin (a1) is prepared by copolymerising an olefin monomer and at least one polyunsaturated comonomer.

As explained above, one type of vinyl group which have the total amount n1 (which is comprised in the total amount of m1 of carbon-carbon double bonds/1000 carbon atoms), may originate from the polyunsaturated comonomer used for the preparation of the unsaturated first polyolefin (a1). The total amount of vinyl groups originating from polyunsaturated comonomer is referred herein as k1. Preferably, the unsaturated first polyolefin (a1) has an amount k1 of vinyl groups/1000 carbon atoms which originate from the polyunsaturated comonomer, of at least 0.03. Upper limit of said k1 of vinyl groups/1000 carbon atoms is not critical and can be typically up to 2.5, preferably up to 2.0. Preferably the total amount k1 of vinyl groups/1000 carbon atoms is between the range 0.05 to 1.5, more preferably 0.1 to 1.0. Of course, the amount k1 of vinyl groups originating from the polyunsaturated comonomer does not exceed the total amount n1 of vinyl groups but is preferably lower.

In addition to the vinyl groups originating from the polyunsaturated comonomer, the total amount of vinyl groups may further comprise vinyl groups originating from a chain transfer agent which introduces vinyl groups, such as propylene.

Preferably, the polyunsaturated comonomer is a diene.

Preferably, the diene comprises at least eight carbon atoms, the first carbon-carbon double bond being terminal and the second carbon-carbon double bond being non-conjugated to the first one.

Preferably, the diene is selected from 1,7-octadiene, 1,9-decadiene, 1,11-dodecadiene, 1,13-tetradecadiene, 7-methyl-1,6-octadiene, 9-methyl-1,8-decadiene, or any mixture thereof.

In addition or as an alternative to the dienes listed above, the diene may also be selected from one or more siloxane compounds having the following formula:

wherein n=1 to 200, and $R_1$ and $R_2$, which can be the same or different, are selected from $C_1$ to $C_4$ alkyl groups and/or $C_1$ to $C_4$ alkoxy groups.

Preferably, $R_1$ and/or $R_2$ are methyl, methoxy or ethoxy. Preferably, n=1 to 100, more preferably 1 to 50.

As an example, divinylsiloxanes such as $\alpha,\omega$-divinylsiloxane can be mentioned.

In addition or as an alternative to the dienes listed above, the diene may also be selected from one or more ether compounds having the following formula:

wherein

R is $-(CH_2)_m-O-$, $-(CH_2CH_2O)_n-$, or $-CH_2-C_6H_{10}-CH_2-O-$, m is 2 to 10, and n is 1 to 5.

In addition to the polyunsaturated comonomer, further comonomers can optionally be used for the preparation of the unsaturated first polyolefin (a1). Such optional comonomers are selected from $C_3$-$C_{20}$ alpha-olefins such as propylene, 1-butene, 1-hexene and 1-nonene, polar comonomers.

As an example, the unsaturated first polyolefin (a1) may contain in addition to the optional polyunsaturated comonomer(s) also small amounts of one or more polar comonomer units of less than 150 micromole, such as 1-100 micromole, 2-80 micromole, 5-60 micromole, 5-50 micromole, more preferably 10-50, most preferably 10-40 micromoles of polar comonomer units per gram of unsaturated first polyolefin.

Preferably, as a polar comonomer of the unsaturated first polyolefin (a1), compounds containing hydroxyl groups, alkoxy groups, carbonyl groups, carboxyl groups, and ester groups, can used. More preferably, compounds containing carboxyl and/or ester groups are used and still more preferably, the compound is selected from the groups of acrylates and acetates, or any mixtures thereof. The acrylate type of polar comonomer is preferred over acetates due to their better resistance to thermal degradation at high temperature.

Still more preferably, the polar comonomer, if present at all, is selected from the group of alkyl acrylates, alkyl methacrylates, and vinyl acetate. Further preferred, the comonomers are selected from $C_1$- to $C_6$-alkyl acrylates, $C_1$- to $C_6$-alkyl methacrylates, and vinyl acetate. Still more preferably, the polar copolymer comprises a copolymer of ethylene with $C_1$- to $C_4$-alkyl, such as methyl, ethyl, propyl or butyl acrylates or vinyl acetate, or any mixture thereof.

Preferably, the polar copolymer of the unsaturated first polyolefin (a1) is prepared by copolymerizing an olefin monomer with a polar comonomer optionally in the presence of polyunsaturated comonomer.

In a preferred embodiment, the olefin monomer is selected from ethylene or $C_3$ to $C_{20}$ alpha-olefins such as propylene, 1-butene, 4-methyl-1-pentene, 1-hexene, 1-octene or 1-nonene, or mixtures thereof. Even more preferred, the olefin monomer is ethylene.

A preferred unsaturated first polyolefin (a1) of the present invention such as an unsaturated polyethylene may have a density higher than 0.860, 0.880, 0.900, 0.910, or 0.915 g/cm³.

A preferred unsaturated first polyolefin (a1) of the present invention such as an unsaturated polyethylene may have a density up to 0.960 g/cm³, less than 0.955, less than 0.950, less than 0.945, less than 0.940, less than 0.935, or less than 0.930 g/cm³.

Most preferred range is 0.915 to 0.930 g/cm³.

Preferably, the unsaturated first polyolefin (a1) has a melt flow rate $MFR_{2.16/19°\,C.}$ in the range of 0.01 to 70 g/10 min, more preferably of 0.1-55 g/10 min, even more preferably of 0.2-40 g/10 min, most preferably of 0.2-10 g/10 min.

The unsaturated first polyolefin can be unimodal or multimodal.

The term "multimodal" means herein, unless otherwise stated, multimodality with respect to molecular weight distribution and includes also bimodal polymer.

Usually, a polyethylene, e.g. LLDPE or LLDPE composition, comprising at least two polyethylene fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer, e.g. LLDPE or LDPE, will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

The multimodal polymer is preferably produced either by mechanical blending of components or in a multi-stage process in a multi-step reaction sequence such as described in WO92/12182.

Preferably, the unsaturated first polyolefin (a1) is a low density polyethylene.

The unsaturated first polyolefin (a1), preferably the unsaturated low density polyethylene, can be produced by any conventional polymerisation process. Preferably, it is produced by radical polymerisation, such as high pressure radical polymerisation. High pressure polymerisation can be effected in a tubular reactor or an autoclave reactor. Preferably, it is a tubular reactor. When preparing the unsaturated first polyolefin (a1) in a high pressure process, polymerization is generally performed at a pressure of 1200 to 3500 bars and a temperature of 150 to 350° C.

Further details about high pressure radical polymerisation are given in WO 93/08222, which is herewith incorporated by reference. However, the unsaturated polyolefin can also be prepared by other types of polymerisation processes such as coordination polymerisation, e.g. in a low pressure process using any type of supported and non-supported polymerization catalyst. As an example, multi-site including dual site and single site catalyst systems such as Ziegler-Natta, chromium, metallocenes of transition metal compounds, non-metallocenes of late transition metals, said transition and later transition metal compounds belonging to group 3-10 of the periodic table (IUPAC 1989). The coordination polymerization processes and the mentioned catalysts are well-known in the field and may be commercially available or produced according to known literature.

Most preferably, the unsaturated first polyolefin (a1) is a low density polyethylene produced in high pressure by radical reaction.

Preferably, the unsaturated first polyolefin (a1) is present in an amount of at least 60 wt %, more preferably at least 70 wt %, more preferably at least 80 wt %. In an embodiment wherein component (i) comprises the unsaturated first polyolefin (a1) as the only polymer component the amount thereof is preferably at least 90 wt % more preferably 95 wt %.

In addition to the unsaturated first polyolefin, the component (i) comprises a crosslinking agent (a2).

In the context of the present invention, a crosslinking agent (a2) is defined to be any compound capable to generate radicals which can initiate a crosslinking reaction. Preferably, the crosslinking agent (a2) contains at least one —O—O— bond or at least one —N=N-bond. More preferably, the crosslinking agent is a peroxide.

Preferably, the crosslinking agent (a2), which is preferably a peroxide, is present in an amount of less than 10 wt %, less than 6 wt %, more preferably less than 5 wt %, less than 3.5 wt %, even more preferably 0.1 wt % to 3 wt %, and most preferably 0.2 wt % to 2.6 wt %, based on the total weight of component (i).

Non-limiting examples of crosslinking agents (a2) are organic peroxides, such as di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, bis(tertbutylperoxyisopropyl)benzene, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy)hexane, 1,1-di(tert-butylperoxy)cyclohexane, 1,1-di(tert amylperoxy)cyclohexane, or any mixtures thereof.

Preferably, the peroxide (a2) is selected from 2,5-di(tert-butylperoxy)-2,5-dimethylhexane, di(tert-butylperoxyisopropyl)benzene, dicumylperoxide, tert-butylcumylperoxide, di(tert-butyl)peroxide, or mixtures thereof. Most preferably, the peroxide is dicumylperoxide.

The unsaturated first polyolefin and the crosslinking agent (a2) can be blended by any conventional mixing process so as to provide the component (i). Exemplary mixing procedures might include melt mixing, e.g. in an extruder, as well as adsorption of liquid peroxide, peroxide in liquid form or a peroxide solution on the polymer.

The component (i) can be provided in the form of a powder, granules, or pellets. In a preferred embodiment, component (i) is provided in the form of pellets.

Preferably, the component (i) containing crosslinking agent such as peroxide is in the form of powder, granules, or pellets.

Optionally, the component (i) comprises an unsaturated low molecular weight compound (a3) having a molecular weight of less than 1000 g/mole, preferably less than 800 g/mole, more preferably of less than 750 g/mole, most preferably of less than 500 g/mole, and a total amount m2 of carbon-carbon double bonds/1000 carbon atoms of >0. The unsaturated low molecular weight compound (a3) can be any compound which contributes to the crosslinking reaction and contains at least one double bond within the molecule. Compound (a3) is other than a crosslinking agent (a2).

Preferably, the unsaturated low molecular weight compound (a3) is selected from so called crosslinking boosters and/or scorch retarders which agents and expressions are well known in W&C field, such as a compound containing at least 1, preferably 2 unsaturated groups, such as an aliphatic or aromatic compound, an ester, an ether, or a ketone containing at least 1, preferably at least 2, unsaturated groups such as a cyanurate, an isocyanurate, a phosphate, an ortho formate, an aliphatic or aromatic ether, or an allyl ester of benzene tricarboxylic acid. Examples of esters, ethers and ketones are compounds selected from general groups of diacrylates, triacrylates, tetraacrylates, triallylcyanurate, triallylisocyanurate, 3,9-divinyl-2,4,8,10-tetra-oxaspiro[5,5]undecane (DVS) or triallyl trimellitate (TATM) or any mixtures thereof.

Preferably, the unsaturated low molecular weight compound (a3) is present in an amount of less than 2.0 wt %, preferably of less than 1.5 wt %, more preferably of less than 1.0 wt %. And the lower limit of said unsaturated low molecular weight compound (a3) is of at least 0.05 wt %, preferably of at least 0.1 wt %, more preferably of at least 0.2 wt %, most preferably of at least 0.25 wt %, based on the weight of component (i).

In preferred embodiments, the unsaturated low molecular weight compound (a3) (measured in a matrix polymer as described below in the Examples) has a total amount m2 of carbon-carbon double bonds/1000 carbon atoms of $\geq 0.05$, preferably of $\geq 0.10$, more preferably of $\geq 0.15$, most preferably of $\geq 0.20$. Preferably the unsaturated low molecular weight compound (a3) has a total amount m2 of carbon-carbon double bonds/1000 carbon atoms of $\leq 3.0$, preferably of $\leq 2.5$, more preferably of $\leq 2.0$. In the Examples, it is described how to measure m2 (see section 1b of the "Measuring Methods").

The unsaturated low molecular weight compound (a3) as defined above, e.g. aliphatic or aromatic compounds, triallylcyanurate, triallylisocyanurate, diacrylates, triacrylates, or tetra-acrylates, DVS or TATM, or mixture thereof, is also known as a so-called crosslinking booster or cure booster. These compounds, if present, can further increase crosslinking efficiency of component (i).

However, within the present invention, it is also possible that the component (i) does not comprise the unsaturated low molecular weight compound as defined above. If it does not comprise the unsaturated low molecular weight compound (a3), m2 is 0.

Optionally, the component (i) may further comprise one or more further polymers, preferably a polar copolymer.

Within the context of the present invention, a polar copolymer is defined to be any copolymer having units derived from a polar comonomer.

Preferably, as a polar comonomer, compounds containing hydroxyl groups, alkoxy groups, carbonyl groups, carboxyl groups, and ester groups, are used.

More preferably, compounds containing carboxyl and/or ester groups are used and still more preferably, the compound is selected from the groups of acrylates and acetates, or any mixtures thereof. The acrylate type of polar comonomer is preferred over acetates due to their better resistance to thermal degradation at high temperature.

Still more preferably, the polar comonomer is selected from the group of alkyl acrylates, alkyl methacrylates, and vinyl acetate. Further preferred, the comonomers are selected from $C_1$- to $C_6$-alkyl acrylates, $C_1$- to $C_6$-alkyl methacrylates, and vinyl acetate. Still more preferably, the polar copolymer comprises a copolymer of ethylene with $C_1$- to $C_4$-alkyl, such as methyl, ethyl, propyl or butyl acrylates or vinyl acetate, or any mixture thereof.

Preferably, the polar copolymer is prepared by copolymerizing an olefin monomer and a polar comonomer.

In a preferred embodiment, the olefin monomer is selected from ethylene or C3 to C20 alpha-olefins such as propylene, 1-butene, 4-methyl-1-pentene, 1-hexene, 1-octene or 1-nonene, or mixtures thereof. Even more preferred, the olefin monomer is ethylene.

When the polar copolymer is prepared by copolymerizing an olefin such as ethylene with a polar comonomer, optionally in the presence of a polyunsaturated comonomer and/or a $C_3$ to $C_{20}$ alpha-olefin comonomer, this is preferably effected in a high pressure process resulting in low density polar ethylene copolymer. The preparation of low density ethylene copolymers with such polar comonomers is very well known in the field and can be effected according to or analogously to high pressure polymerisation methods disclosed in polymer literature. Reference can also be made to above WO93/08222.

Preferably, the polar copolymer has an amount of units derived from the polar comonomer of more than 500, preferably of more than 700, more preferably of more than 900, even more preferably of more than 1100, micromoles of polar comonomer units per gram of polar copolymer. The upper limit may be e.g. up to 6000.

Preferably, the polar copolymer has a melt flow rate $MFR_{2.16/190° C.}$ in the range of 0.1 to 70 g/10 min, more preferably 0.5-55 g/10 min, even more preferably 0.5-40 g/10 min.

In a preferred embodiment, the component (i) may further comprise a scorch retarder. In the context of the present invention, a "scorch retarder" is defined to be a compound that reduces the formation of scorch during extrusion of a polymer composition, at typical extrusion temperatures used, if compared to the same polymer composition extruded without said compound. Besides scorch retarding properties, the scorch retarder may simultaneously result in further effects like boosting, i.e. enhancing crosslinking performance during the crosslinking step. Then it is in this invention said unsaturated low molecular weight compound (a3) of component (i).

Preferably, the scorch retarder is selected from 2,4-diphenyl-4-methyl-1-pentene, substituted or unsubstituted diphenylethylene, quinone derivatives, hydroquinone derivatives, mono functional vinyl containing esters and ethers, or mixtures thereof. More preferably, the scorch retarder is selected from 2,4-diphenyl-4-methyl-1-pentene, substituted or unsubstituted diphenylethylene, or mixtures thereof. Most preferably, the scorch retarder is 2,4-diphenyl-4-methyl-1-pentene.

Preferably, the amount of scorch retarder is within the range of 0.005 to 2.0 wt.-%, more preferably within the range of 0.005 to 1.5 wt.-%, based on the weight of the component (i). Further preferred ranges are e.g. from 0.01 to 0.8 wt %, 0.03 to 0.75 wt %, 0.05 to 0.70 wt %, or 0.05 to 0.60 wt %, based on the weight of the component (i).

The component (i) may contain further additives, such as antioxidants, stabilisers, and/or processing aids. As an antioxidant, sterically hindered or semi-hindered phenols, aromatic amines, aliphatic sterically hindered amines, organic phosphates, thio compounds, and mixtures thereof, can be mentioned. As further additives, flame retardant additives, tree retardant additives, acid scavengers, inorganic fillers and voltage stabilizers can be mentioned.

As already indicated above, the component (i), i.e. the blend of the first polyolefin (a1), the crosslinking agent (a2), and optional additives such as the unsaturated low molecular weight compound (a3) or a polar copolymer, can be provided in any appropriate form, e.g. pellets, granules or powder. Preferably, the component (i) is provided in the form of pellets.

Component (ii)

Component (ii) comprises the "second polymer" having a total amount m3 of carbon-carbon double bonds/1000 carbon atoms of ≥0. Thus, in principle the second polymer may be completely saturated (m3=0) as well as include some double bonds (m3>0). As already indicated above, the term "total amount of carbon-carbon double bonds" refers to those double bonds originating from vinyl groups, vinylidene groups and trans-vinylene groups of the polyolefin. Just like for the unsaturated first polyolefin (a1), these carbon-carbon double bonds can be introduced by using polyunsaturated comonomers or via chain transfer agents that introduce vinyl groups or being formed by the process.

The total amounts of carbon-carbon double bonds of the unsaturated first polyolefin of component (i) and, if present, the unsaturated low molecular weight compound (a3) of component (i), and the second polymer of component (ii) and, if present, the unsaturated low molecular weight compound (b2) of component (ii) have to be adapted to each other such that m1, m2, m3 and m4 satisfy the following relationship:

$$(m1+m2)-(m3+m4) \geq -3.0,$$

wherein m2 and/or m4 is/are 0 if the unsaturated low molecular weight compound(s) (a3) and/or (b2) is/are not present, and the component (i) is different from component (ii), more preferably the unsaturated first polyolefin (a1) of component (i) is different from the second polymer of component (ii).

Preferably, m1, m2, m3 and m4 satisfy the following relationship:

$$3.0 \geq (m1+m2)-(m3+m4) \geq -3.0;$$

more preferably $2.0 \geq (m1+m2)-(m3+m4) \geq -2.0;$ even more preferably $1.5 \geq (m1+m2)-(m3+m4) \geq -1.5$ In another preferred embodiment, m1, m2, m3 and m4 satisfy the following relationship:

$$1.0 \geq (m1+m2)-(m3+m4) \geq -1.0.$$

In another preferred embodiment, m1, m2, m3 and m4 satisfy the following relationship:

$$(m1+m2)-(m3+m4) \geq 0.1;$$

more preferably $(m1+m2)-(m3+m4) \geq 0.2;$ even more preferably $2.0 \geq (m1+m2)-(m3+m4) \geq 0.1;$ even further preferably $2.0 \geq (m1+m2)-(m3+m4) \geq 0.2.$ As already indicated above when discussing component (i), the presence of the unsaturated low molecular weight compound (a3) in component (i) is not mandatory. If present, it contributes to crosslinking efficiency of component (i). If not present, the relationships provided above do not include anymore m2 or, in other words, m2 is 0. If present, m2 is >0 and is determined as described in the Examples.

The same applies to the unsaturated low molecular weight compound (b2) in component (ii), i.e. its presence is not mandatory. If present, it contributes to crosslinking efficiency of component (ii). If not present, the relationships provided above do not include anymore m4 or, in other words, m4 is 0. If present, m4 is >0 and is determined as described in the Examples.

Preferably, the second polymer component is any type of polymer. Preferably a polyolefin, more preferably a polyalpha-olefin including homopolymers and copolymers thereof. Most preferably the polyolefin is selected from an ethylene homo- or copolymer, a propylene homo- or copolymer, or any mixture thereof. More preferably, the second polymer is an ethylene homo- or copolymer.

The second polymer, preferably a polyethylene homo- or copolymer, can be polymerized in a low pressure process.

In a preferred embodiment, the second polymer, preferably the polyethylene is polymerized in a high pressure reactor by radical reaction, either in an autoclave or a tubular reactor, at a pressure between 1200 to 3500 bars and at a temperature between 150 to 350° C. Again, for the high pressure preparation process, reference is made to WO93/08222.

If the second polymer of component (ii) is a polyolefin, its density range is not critical. For the suitable density range of the second polyolefin of component (ii), reference is made to density range given for the unsaturated first polyolefin (a1).

Preferably, the second polymer contains double bonds other than vinyls originating from polyunsaturated comonomer.

Preferably, the second polymer does not comprise vinyl groups which originate from a polyunsaturated comonomer.

In a preferred embodiment, the polyethylene contains at least 60 wt-% ethylene monomer units. In other preferred embodiments, the polyethylene contains at least 70 wt-%, at least 80 wt-% or at least 90 wt-% ethylene monomer units.

Alternatively or in addition to the optional polyunsaturated comonomer, other optional comonomers can be used for the preparation of the second polymer. Such optional comonomers may be selected from $C_3$-$C_{20}$ alpha-olefins such as propylene, 1-butene, 1-hexene and 1-nonene, polar comonomers such as acrylates, methacrylates or acetates and mixtures thereof. For more detailed description of the polar comonomers, reference is made to the polar comonomers discussed above in relation to polar copolymer of unsaturated first polyolefin (a1)

As an example, the second polymer may contain one or more polar comonomer units, such as more than 150, preferably more than 500, preferably of more than 700, more preferably of more than 900, even more preferably of more than 1100, micromoles of polar comonomer units per gram of second polymer. The upper limit may be e.g. up to 6000 micromoles of polar comonomer units per gram of second polymer.

A multimodal polymer can be produced by blending (either by blending pellets or by blending the different components in the molten state) of the components or it can be produced directly in several types of processes, e.g. those described in WO 92/12182.

The catalyst for the production of the polyolefin, preferably polyethylene homopolymer or polyethylene copolymer, may be a chromium, a Ziegler-Natta or a single-site catalyst. Single-site catalysts are described in EP 0 688 794, EP 0 949 274, WO 95/12622 and WO 00/34341.

In a preferred embodiment, the ethylene homo- or copolymer is selected from a low density polyethylene, a linear low density polyethylene, or any mixture thereof.

Preferably, the ethylene homo- or copolymer, e.g. low density polyethylene, has a melt flow rate $MFR_2$(190° C.) within the range of 0.01 to 1000 g/10 min, more preferably 0.01 to 500 g/10 min, even more preferably 0.01 to 300 g/10 min.

As discussed above, the second polymer may contain carbon-carbon double bonds. Just like for the unsaturated first polyolefin, these double bonds can be introduced into the polymer by copolymerising an olefin, preferably propylene or ethylene, more preferably ethylene, optionally with a polyunsaturated comonomer. In this respect, reference is made to the statements made above when discussing the unsaturated first polyolefin (a1) of component (i). The same type of polyunsaturated comonomers and the same reaction conditions can be used for the second polymer as well. The double bonds can also be generated by chain transfer agents introducing vinyl groups or they are introduced by the process.

Preferably, the second polymer has a total amount m3 of carbon-carbon double bonds/1000 carbon atoms of at least 0.10. Upper limit is not critical and can be typically up to 3.0, preferably up to 2.5. Preferably the total amount of m3 of carbon-carbon double bonds/1000 carbon atoms is between the range 0.2 to 2.0, more preferably 0.3 to 2.0.

In a preferred embodiment, $m1 \neq m3$.

In a preferred embodiment, the second polymer has a total amount n2 of vinyl groups/1000 carbon atoms of at least 0.03. Upper limit is not critical and can be typically up to 2.5, preferably up to 2.2. Preferably the total amount of n2 of vinyl groups/1000 carbon atoms is between the range 0.1 to 2.0, more preferably 0.1 to 1.5.

Optionally, the component (ii) may comprise a crosslinking agent.

If present at all, the amount of crosslinking agent is preferably less than 5.0 wt %, more preferably less than 3.0 wt %, even more preferably less than 2.0 wt %, and even further preferred less than 1.0 wt %, based on the weight of the component (ii).

In a preferred embodiment, the component (ii) does not comprise any crosslinking agent.

If component (ii) does not comprise a crosslinking agent, it may be preferred that it contains a stabiliser.

With regard to appropriate crosslinking agents, if present in the component (ii), reference is made to the statements provided above when discussing component (i).

The second polymer and the crosslinking agent, if present, can be blended by any conventional mixing process so as to provide the component (ii). Exemplary mixing procedures might include melt mixing, e.g. in an extruder, as well as adsorption of liquid peroxide, peroxide in liquid form, molten peroxide, or a peroxide solution on the polymer which maybe in the form of a powder, pellets etc.

The component (ii) can be provided in the form of a powder, granules, or pellets. In a preferred embodiment, component (ii) is provided in the form of pellets.

Optionally, the component (ii) may also comprise an unsaturated low molecular weight compound (b2) having a molecular weight of less than 1000 g/mole and a total amount m4 of carbon-carbon double bonds/1000 carbon atoms of >0. Reference can be made to the statements provided above, when discussing the properties of compound (a3) of component (i). However, in a preferred embodiment, the component (ii) does not comprise the unsaturated low molecular weight compound (b2).

The component (ii) may contain further additives, such as antioxidants, stabilisers, processing aids, scorch retarders, and/or crosslinking boosters. As antioxidant, sterically hindered or semi-hindered phenols, aromatic amines, aliphatic sterically hindered amines, organic phosphates, thio compounds, and mixtures thereof, can be mentioned. Typical crosslinking boosters may include compounds as disclosed above in relation to component (i). As further additives, flame retardant additives, tree retardant additives, acid scavengers, inorganic fillers and voltage stabilizers can be mentioned.

The component (ii) may also comprise a further polymer component, preferably a polar copolymer. With regard to appropriate polar copolymers which could be included into component (ii), reference is made to the statements provided above when discussing component (i).

In other preferred embodiments, especially when water tree retarding properties are desired, the polar copolymer present in component (i) and/or component (ii) has an amount of units derived from the polar comonomer of more than 150 micromoles, preferably 500 micromoles, 700 micromoles, more than 900 micromoles, or more than 1100 and up to 6000 micromoles, of polar comonomer units per gram of polar copolymer.

Preferably, the polar copolymer has a melt flow rate $MFR_{2.16/190° C.}$ in the range of 0.1 to 70 g/10 min, more preferably 1-55 g/10 min, even more preferably 1.5-40 g/10 min.

Forming a Blend of Components (i) and (ii)

Accordingly, polymers usable in component (i) and (ii), as well as composition of component (i) and (ii) in pellet form are e.g. conventionally known and can be commercially available or be produced according to or analogously to known polymerisation and compounding processes which are described in the polymer literature, e.g. as described above. As suitable examples of component (i) are commercial polymer grades in pellet form available from Borealis under Supercure™ product family.

A blend is formed from components (i) and (ii) defined above wherein the weight ratio of the component (i) to the component (ii) is within the range of 10:90 to 99:1.

Preferably, the amount of component (i) is typically of more than 20 wt %, such as 35 wt %, preferably 50 wt %, preferably at least 55 wt %, preferably of at least 60 wt %, more preferably of at least 60 wt % to 95 wt %, of the total amount of component (i) and component (ii) (component (i)+component (ii)) Preferably, the amount of component (ii) is typically of not more than 80 wt %, such as of not more than 65 wt %, preferably of not more than 50 wt %, preferably of 45 wt % or less, preferably of 40 wt % or less, more preferably of from 5 to 40 wt %, of the total amount of component (i) and component (ii) (component (i)+component (ii)).

Of course, these are only exemplary ranges and further ranges can be accomplished by appropriate combination of the preferred upper and lower limits mentioned above. Appropriate ranges can be chosen such that a beneficial compromise between a cost-effective manufacturing process and a sufficiently high degree of crosslinking, possibly in combination with wet ageing resistance, is achieved. As explained above, wet ageing can be further improved by adding for example a polar copolymer to component (i) and/or component (ii).

Blending of components (i) and (ii) can be accomplished by any conventional mixing technique known to the skilled person.

The components (i) and (ii) can be blended in an extruder prior to the preparation of the article or in the extruder during the preparation of the article which preferably is a layered article, such as a cable. Preferably, the components (i) and (ii) are blended in the extruder during the preparation of the layered article. For the extrusion step, any conventional extruder can be selected, e.g. a single screw extruder and a twin screw extruder. Preferably, a temperature profile within the extruder is chosen so as to optimise extrusion rate but suppress scorch as much as possible and still achieving melting and enough homogenization.

Preferably, the component (i) and/or the component (ii) is/are provided in the form of pellets and the pellets are fed to the extruder.

Accordingly, preferred article is a layered article, more preferably a crosslinkable layered article. Also an article, preferably a layered article, in crosslinked form is provided.

Applying the Blend Onto a Substrate

After having formed a blend of components (i) and (ii), one or more layers of said blend are applied onto a substrate. Preferably, the layered article is a cable, more preferable a power cable comprising one or more layers containing the blend of component (i) and component (ii). More preferably said layer containing the blend of the invention is an insulation layer of a crosslinkable power cable. Accordingly the layer of the blend of component (i) and (ii) of the invention in the cable is crosslinkable.

Preferably, the blend is extruded onto the metallic conductor of a power cable and/or at least one coating layer thereof, e.g. a semiconductive layer or insulating layer. In the context of the present invention, a power cable is defined to be a cable that transfers energy operating at any voltage. The voltage applied to the power cable can be alternating (AC), direct (DC), or transient (impulse). In a preferred embodiment, the multilayered article is a power cable operating at voltages higher than 1 kV.

The term "conductor" means herein above and below that the conductor comprises one or more wires. Moreover, the cable may comprise one or more such conductors. Preferably the conductor is an electrical conductor.

After having applied the blend onto a substrate, the process of the present invention preferably comprises a further step (e), for crosslinking the article, preferably layered article, more preferably a cable, most preferably a power cable, wherein the blend is treated under crosslinking conditions.

Crosslinking can be effected by treatment at increased temperature, e.g. at a temperature of at least 160° C. When peroxides are used, crosslinking is generally initiated by increasing the temperature to the decomposition temperature of the corresponding peroxide.

Preferably, the crosslinked blend has a hot set elongation of less than 175% at 200° C. and a load of 0.2 MPa, measured according to IEC 60811-2-1. In other words, crosslinking conditions are maintained until the crosslinked composition has the preferred hot set elongation value as specified above. This method is also called "hot set" and indicates the degree of crosslinking. Lower hot set value means less thermal deformation and, consequently, higher degree of crosslinking More preferably, the hot set elongation value is less than 150%, even more preferably less than 120%, and even more preferably less than 100%.

Preferably, the crosslinked blend has a permanent deformation of less than 15%, more preferably less than 12%, even more preferably less than 10%, measured according to IEC 60811-2-1 as described in further detail in the Examples.

In one embodiment, the crosslinked blend preferably comprises a polar copolymer in component (i) and/or component (ii) and has an electrical breakdown strength of at least 40 kV/mm after 1000 h wet ageing at a water bath temperature of 70° C. and a conductor temperature of 85° C. and an electrical stress of 9 kV/mm.

As already indicated above, the layered article is preferably a power cable, preferably crosslinkable power cable.

According to a further aspect, the present invention provides a crosslinkable polymer composition, comprising a blend of two components (i) and (ii), wherein (a) component (i) comprises (a1) an unsaturated first polyolefin having a total amount m1 of carbon-carbon double bonds/1000 carbon atoms of >0, (a2) a crosslinking agent, (a3) optionally an unsaturated low molecular weight compound having a molecular weight of less than 1000 g/mole and a total amount m2 of carbon-carbon double bonds of >0, (b) component (ii) comprises (b1) a second polymer having a total amount m3 of carbon-carbon double bonds/1000 carbon atoms of ≥0, (b2) optionally an unsaturated low molecular weight compound having a molecular weight of less than 1000 g/mole and a total amount m4 of carbon-carbon double bonds of >0, wherein m1, m2, m3 and m4 satisfy the following relationship:

$$(m1+m2)-(m3+m4) \geq -3.0,$$

m2 and/or m4 being 0 if the unsaturated low molecular weight compound(s) (a3) and/or (b2) is/are not present, the component (i) is different from component (ii); and the weight ratio of the component (i) to the component (ii) is within the range of 10:90 to 99:1.

As already indicated above, the term "total amount of carbon-carbon double bonds", when used in combination with the first unsaturated polyolefin of componenent (i) and second polymer of component (ii), refers to those double bonds originating from vinyl groups, vinylidene groups and trans-vinylene groups.

The amount of each type of double bond is measured as indicated in the experimental part.

According to a further aspect, the present invention provides the use of the crosslinkable polymer composition (i.e. the blend of components (i) and (ii)) as defined above for the preparation of a layered article, preferably a power cable.

According to a further aspect, the present invention provides the use of component (i) as defined above in combination with component (ii) as defined above for the preparation of a layered article, preferably a power cable. Components (i) and (ii) can be prepared at different locations and are subsequently transported to the processing device, e.g. the cable manufacturing device comprising the extruder. The components (i) and (ii) can be stored and transported separately. However, they can also be provided in the form of a kit, i.e. a set containing both components, preferably in the form of pellets.

According to a further aspect, the present invention provides a layered article, preferably a power cable, which is obtainable by the process as defined above. Preferably, sample taken from at least one layer consisting of the blend of component (i) and component (ii) of said article has a hot set elongation of less than 175%, more preferably less than 150%, even more preferably less than 100% at 200° C. and a load of 0.2 MPa, measured according to IEC 60811-2-1.

EXAMPLES

Measuring Methods

1a. Total Amount m1 and m3 of Carbon-Carbon Double Bonds of the Unsaturated First Polyolefin (a1) of Component (i) and the Second Polymer of Component (ii)

The procedure for the determination of the amount of double bonds/1000 C-atoms is based upon the ASTM D3124-72 method. In that method, a detailed description for the determination of vinylidene groups/1000 C-atoms is given based on 2,3-dimethyl-1,3-butadiene. The described sample preparation procedure has also been applied for the determination of vinyl groups/1000 C-atoms, vinylidene groups/1000 C-atoms and trans-vinylene groups/1000 C-atoms in the present invention. However, for the determination of the extinction coefficient for these three types of double bonds, the following three compounds have been used: 1-decene for vinyl, 2-methyl-1-heptene for vinylidene and trans-4-decene for trans-vinylene, and the procedure as described in ASTM-D3124 section 9 was followed.

The total amount of double bonds was analysed by means of IR spectrometry and given as the amount of vinyl bonds, vinylidene bonds and trans-vinylene bonds per 1000 carbon atoms.

Thin films were pressed with a thickness of 0.5-1.0 mm. The actual thickness was measured. FT-IR analysis was performed on a Perkin Elmer 2000. Four scans were recorded with a resolution of 4 $cm^{-1}$.

A base line was drawn from 980 $cm^{-1}$ to around 840 $cm^{-1}$. The peak heights were determined at around 888 $cm^{-1}$ for vinylidene, around 910 $cm^{-1}$ for vinyl and around 965 $cm^{-1}$ for trans-vinylene. The amount of double bonds/1000 carbon atoms was calculated using the following formulas:

$$\text{vinylidene}/1000 \text{ C-atoms} = (14 \times A)/(18.24 \times L \times D)$$

$$\text{vinyl}/1000 \text{ C-atoms} = (14 \times A)/(13.13 \times L \times D)$$

$$\text{trans-vinylene}/1000 \text{ C-atoms} = (14 \times A)/(15.14 \times L \times D)$$

wherein

A: absorbance (peak height)
L: film thickness in mm
D: density of the material (g/$cm^3$)

The amount of vinyl groups originating from the polyunsaturated comonomer per 1000 carbon atoms was determined as follows:

The polymer to be analysed and a reference polymer have been produced on the same reactor, basically using the same conditions, i.e. similar temperature, pressure and production rate, but with the only difference that the polyunsaturated comonomer is added to polymer to be analysed and not added to reference polymer. The total amount of vinyl groups of each polymer was determined by FT-IR measurements, as described above. Then, it is assumed that the base level of vinyl groups, i.e. the ones formed by the process and from chain transfer agents resulting in vinyl groups (if present), is the same for the reference polymer and the polymer to be analysed with the only exception that in the polymer to be analysed also a polyunsaturated comonomer is added to the reactor. This base level is then subtracted from the measured amount of vinyl groups in the polymer to be analysed, thereby resulting in the amount of vinyl groups/1000 C-atoms, which result from the polyunsaturated comonomer.

1b. The total Amount of m2 and m4, Respectively, of Carbon-Carbon Double Bonds from Unsaturated Low Molecular Weight Compound (a3) and (b2), Respectively, Mixed in a Matrix Polymer.

Calibration Procedure

The molar absorptivity for the substance can be determined according to ASTM E275. At least three solutions of the substance in $CS_2$ (carbon disulfide) are prepared. The used concentrations of the solutions are 0.18 mol/l. The solutions are analysed with FTIR and scanned with resolution 4 $cm^{-1}$ in a liquid cell with path length 0.1 mm. The maximum intensity of the absorbance peak that can be related to the unsaturated structure(s) (each type of carbon-carbon double bonds present) in m2 or m4 is measured.

The molar absorptivity, B, in liters/mol×mm for each solution is calculated from the following equation:

$$B = (1/CL) \times A$$

C=concentration of each type of carbon-carbon double bond to be measured, mol/l
L=cell thickness, mm
A=maximum absorbance (peak height) of the peak of each type of carbon-carbon double bond to be measured, mol/l Measurements of the Total Amount m2 and m4, Respectively, of Carbon-Carbon Double Bonds of the Unsaturated Low Molecular Weight Compound (a3) and (b2), Respectively, in Matrix Polymer The FTIR measurements are done according to ASTM D3124-72.

Film samples were prepared using polyethylene as a matrix polymer without the substance and containing the substance. Film samples with thickness of 0.5-1 mm are prepared by compression molding. The films are analysed with FTIR and scanned with resolution 4 $cm^{-1}$.

If the m2 and m4, respectively, double bonds of the substance are partly overlapping by absorptions originating from the matrix polymer, in this case polyethylene, the calculations should be done on difference spectra of the samples and the matrix polymer.

The total amount m2 or m4 of each type of C—C double bond expressed as "number/1000 $CH_2$" is calculated from the following equation:

$$(A \times 14)/(B \times \text{th} \times \text{dens})$$

A=maximum absorbance of the double-bond peak of interest of the substance
B=the molar absorptivity in liters/mol×mm for the substance as determined above
th=the used film thickness in mm
dens=density of the used matrix polymer g/$cm^3$ 2. Crosslinking and Hot Set Elongation and Permanent Deformation Ready-made pellets of component (i) were blended with the component (ii) pellets. This blend of pellets was extruded into a tape on a Brabender tape extruder using a compression screw at a screw speed of around 45 rpm and a temperature setting between 110° C. and 125° C. The extruded tape was around 2 mm in thickness.

Hot set elongation and permanent deformation are determined on crosslinked plaques. These plaques are prepared from the extruded tapes as follows: First, the pellets were melted at 120° C. at around 20 bar for 1 minutes. Then the pressure was increased to 200 bar, followed by ramping the temperature up to 180° C. which takes 4 min. The material was then kept at 180° C. for 8 minutes and after that it was cooled down to room temperature at a cooling rate of 15° C./min. The thickness of the plaque was around 1.8 mm.

The hot set elongation as well as the permanent deformation were determined on dumbbell shaped specimens samples punched out from the crosslinked plaques. The samples were marked with a reference length of 20 mm. These properties were determined according to IEC 60811-2-1. In the hot set test, a dumbbell of the tested material is equipped with a weight corresponding to 20 N/cm². This specimen is placed in an oven at 200° C. and after 15 minutes, the distance between the reference marks is measured, e.g. the elongation is measured. Subsequently, the weight is removed and the sample is allowed to relax for 5 minutes. Then, the sample is taken out from the oven and is cooled down to room temperature. Then, the distance between the reference marks is measured, e.g. the so-called permanent deformation is determined. Reported values are average values based on three measurements.

3. Melt Flow Rate

The melt flow rate is equivalent to the term "melt index" and is determined according to ISO 1133 and is indicated in g/10 min. Melt flow rate is determined at different loadings, such as 2.16 kg ($MFR_2$). Melt flow rate is determined at a temperature of 190° C. for polyethylene and at 230° C. for polypropylene.

4. Wet Ageing Test

The wet ageing test is based on a procedure described in an article by Land H. G. and Schädlich H., "Model Cable Test for Evaluating the Ageing Behaviour under Water Influence of Compounds for Medium Voltage Cables", Conference Proceedings of Jicable 91, Jun. 24 to 28, 1991, Versaille, France.

The wet ageing properties were evaluated on model cables (minicables). These cables consist of a Cu wire onto which an inner semiconductive layer, an insulation layer and an outer semiconductive layer are applied. The model cable has the following construction: inner semiconductive layer of 0.7 mm, insulation layer of 1.5 mm and outer semiconductive layer of 0.15 mm. The cables are extruded and vulcanised, i.e. the material is crosslinked. After this the model cables are preconditioned at 80° C. for 72 h.

The Cu wire is removed and then replaced by a thinner Cu wire. The cables are put into water bath to be aged for 1000 h under electric stress and at a temperature of 70° C. of the surrounding water and at a temperature of the water in the conductor area of 85° C. The initial breakdown strength as well as the breakdown strength after 1000 h wet ageing are determined.

The cables are prepared and aged as described below.

| Preconditioning: | 80° C., 72 h |
| Applied voltage: | 9 kV/50 Hz |
| Electric stress (max.): | 9 kV/mm |
| Electric stress (mean): | 6 kV/mm |
| Conductor temperature: | 85° C. |
| Water bath temperature: | 70° C. |
| Ageing time: | 1000 h |

Deionized water is used in conductor area and outside the outer semicon if not otherwise stated Five specimens with 0.50 m active length from each cable were aged.

The specimens were subjected to ac breakdown tests (voltage ramp: 100 kV/min.) and the Weibull 63.2% values of the breakdown strength (field stress at the inner semiconductive layer) are determined before and after ageing.

5. Amount of Polar Comonomer Units Within the Polymer Composition (Either Crosslinkable or Crosslinked)

The calculation of the amount of polar comonomer units within the polymer (either crosslinkable or crosslinked) is explained by making reference to the following example:

1 g formulation contains 27 wt-% of the polar ethylene copolymer. The polar ethylene copolymer contains 10 wt-% polar comonomer units. The molecular weight of the polar comonomer unit used ($M_{polar\ comonomer\ unit}$) has to be introduced, for example 86 g/mole for methylacrylate, and 128 g/mole for butylacrylate.

(1×0.27×0.10)/128=211×10-6 moles (211 micromoles for butylacrylate in the polymer composition)

6. Density

Density was measured according to ISO 1183D and sample preaparation according to ISO1872-2.

Experimental Part

Example 1

In Example 1, the following components were blended at different weight ratios:

For the component (i), the grade Supercure™ LE8201R (commercially available from Borealis) was used which is a natural crosslinkable low density polyethylene (LDPE) containing diene as a polyunsaturated comonomer and which was produced in high pressure by radical polymerisation. This grade has the following properties:

$MFR_2$=2 g/10 min

Density=922 kg/m³

Crosslinking agent: Dicumylperoxide was present in an amount of ≤2.5 wt %

Total amount of double bonds in the component (i) (determined in the absence of peroxide): 0.77 double bonds/1000 C (0.50 vinyl/1000 C, 0.21 vinylidene/1000 C and 0.06 trans-vinylene/1000 C).

Component (ii) consisted of a low density PE (LDPE) homopolymer, commercially available from Borealis under the name LE1800 with an $MFR_2$ of 2.0 and a total amount of double bonds of 0.37/1000 C (0.11 vinyl/1000 C, 0.22 vinylidene/1000 C and 0.04 trans-vinylene/1000 C).

Ready-made pellets of component (i) were blended with the LDPE pellets (i.e. component (ii)). This blend of pellets was extruded into a tape on a Brabender tape extruder using a compression screw at around 45 rpm and a temperature setting between 110 and 125° C. The extruded tape was around 2 mm in thickness. The crosslinked plaque was prepared from these extruded tapes.

Figure 1:
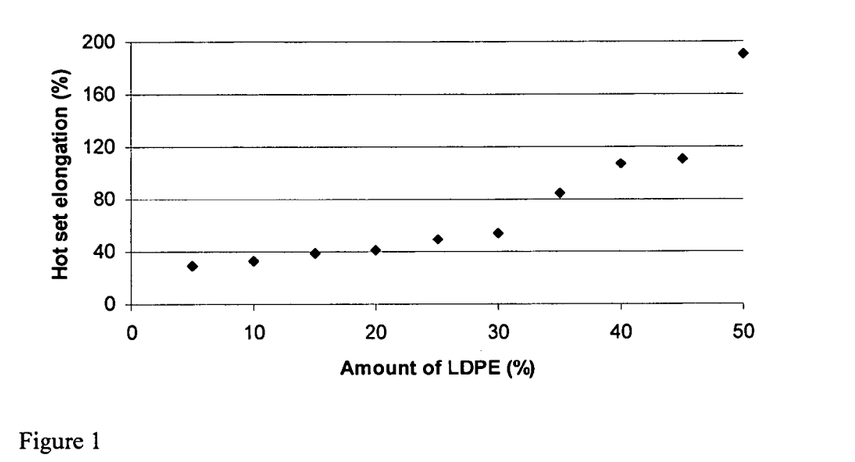
FIG. 1 is a graph depicting hot set elongation behaviors of Example 1.

The hot set elongation and permanent deformation were measured for the different blends. The results are shown in Table 1 and FIG. 1.

TABLE 1

Degree of crosslinking of the blends

| Amount of LDPE added to component (i) (in wt %) | Hot set elongation (%) | Permanent deformation (%) |
| --- | --- | --- |
| 5 | 30 | −5 |
| 10 | 33 | −3 |
| 15 | 39 | −4.5 |
| 20 | 42 | −4.5 |
| 25 | 50 | −4 |
| 30 | 55 | −2.5 |
| 35 | 84 | 1 |
| 40 | 107 | 0 |
| 45 | 111 | 0.5 |
| 50 | 190 | 5 |

Example 2

To improve the wet ageing properties, while achieving sufficient crosslinking, 20 wt % of a poly(ethylene-co-acrylate) polymer with an acrylate content of 21 wt % was added to the component (i) given in Example 1. The wet ageing was evaluated in the model cable test as described above in the Measuring Methods. After 1000 h of wet ageing, a breakdown strength of 48.4 kV/mm was achieved, compared to 40.4 kV/mm if no addition of the poly(ethylene-co-acrylate) is made.

Example 3

In Example 3, the following components were blended at different weight ratios:

Component (i) which is the commercially available LDPE grade Supercure™ LC8205R available from Borealis and has a density of 924 kg/m$^3$ and a MFR$_2$=3 g/10 min. The composition contained also a poly(ethylene-co-acrylate) polymer. Crosslinking agent: Dicumylperoxide was present in an amount of ≤2.5 wt %. The component (i) contained a total amount of double bonds per 1000 C of 0.77 (determined in the absence of peroxide) (0.49 vinyl/1000 C, 0.23 vinylidene/1000 C and 0.05 trans-vinylene/1000 C)

Component (ii) consisted of a low density PE homopolymer with an MFR$_2$ of 2.0 and a total amount of vinyl groups/1000 C of 0.11 (see description in Example 1). The amounts of component (ii) used in two examples were 20 wt % and 40 wt %

Figure 2:
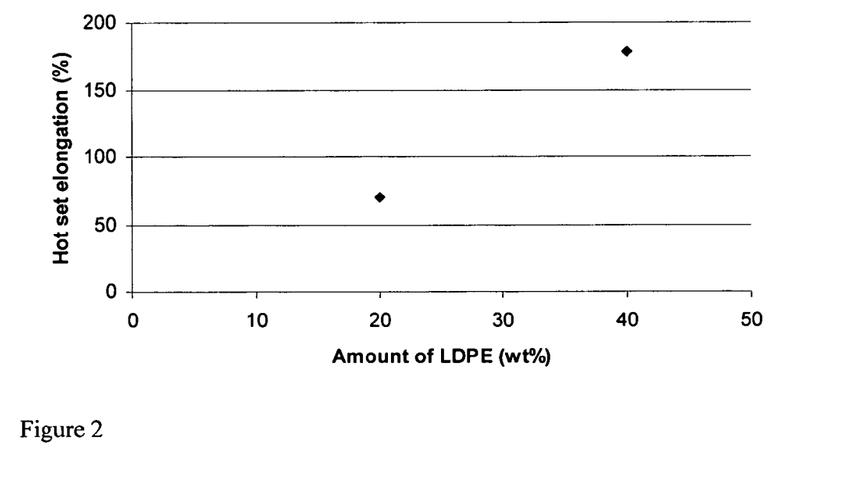
FIG. 2 is a graph depicting hot set elongation behaviors of Example 3.

For each of these blends, the hot set elongation was measured. The results are shown in FIG. 2.

Example 4

From the sample of Example 3 including 20 wt % LDPE, a model cable was prepared and then aged according to the wet ageing test as described above. A high level of breakdown strength of 73.6 kV/mm was obtained after 1000 h of wet ageing.

Example 5

The component (i) of Example 1 was blended with a component (ii) which was LDPE having an MFR$_2$ of 0.8 g/10 min and a total amount of double bonds per 1000 C of 0.37 (0.11 vinyl/1000 C, 0.22 vinylidene/1000 C and 0.04 trans-vinylene/1000 C). Amount of LDPE (ii) added to component (i): 35 wt %.

Hot set elongation and permanent deformation were measured.

| | |
|---|---|
| Hot set elongation: | 85% |
| Permanent deformation: | −4% |

Example 6

The component (i) of Example 1 was blended with a component (ii) which was LDPE having an MFR$_2$ of 2 g/10 min and a total amount of double bonds per 1000 C of 0.57 (0.28 vinyl/1000 C, 0.23 vinylidene/1000 C and 0.06 trans-vinylene/1000 C). Amount of LDPE added to component (i): 35 wt %.

Hot set elongation and permanent deformation were measured.

| | |
|---|---|
| Hot set elongation: | 65% |
| Permanent deformation: | −6% |

Example 7

Component (i) was a poly(ethylene-co-diene) polymer with a total amount of double bonds/1000 C of 1.45 (determined in the absence of peroxide) (1.1 vinyl/1000 C, 0.24 vinylidene/1000 C and 0.11 trans-vinylene) and an MFR2=2.7 g/10 min. This is a low density polyethylene produced in a high pressure reactor.

The amount of crosslinking agent was ≤2.5 wt % of dicumylperoxide.

Blends of Example 7a, Example 7b and Example 7c are prepared with 20, 40 and, respectively, 60 wt % of the LDPE component as described in Example 1.

TABLE 3

| Degree of crosslinking of the blends | | |
|---|---|---|
| | Hot set elongation (%) | Permanent deformation (%) |
| Example 7a | 25 | −3.5 |
| Example 7b | 48 | −2.3 |
| Example 7c | 169 | 1.7 |

Example 8

Component (i) was a poly(ethylene-co-diene) polymer with a total amount of double bonds/1000 C of 1.17 (determined in the absence of peroxide) (0.82 vinyl/1000 C, 0.24 vinylidene/1000 C and 0.11 trans-vinylene). MFR2=2.7 g/10 min. This is a low density polyethylene produced in a high pressure reactor.

The amount of crosslinking agent was ≤2.5 wt % of dicumylperoxide.

This component (i) was blended with 20, 40, 60 wt % of the LDPE component (ii) as described in Example 1.

20 wt % LDPE: 26% hot set elongation, −3.6% permanent deformation 40 wt % LDPE: 54% hot set elongation, −2.7% permanent deformation 60 wt % LDPE: 209% hot set elongation, 3.3 permanent deformation

Example 9

As the component (i) a commercially available low density polyethylene (LDPE) homopolymer (produced in a high pressure reactor) was used with a total amount of double bonds of 0.37/1000 C (determined in the absence of peroxide) (0.11 vinyl/1000 C, 0.22 vinylidene/1000 C and 0.04 trans-vinylene/1000 C). Crosslinking agent: Dicumylperoxide was present in an amount of ≤2.5 wt %. To this Component (i) a poly(ethylene-co-diene) polymer with a total amount of double bonds/1000 C of 1.17 (0.82 vinyl/1000 C, 0.24 vinylidene/1000 C and 0.11 trans-vinylene) having an MFR2=2.7 g/10 min was added as Component (ii) in an amount of 25 wt %. This is a low density polyethylene produced in a high pressure reactor.

Hot set elongation and permanent deformation of this blend were measured.

| | |
|---|---|
| Hot set elongation: | 67% |
| Permanent deformation: | −1.3% |

We claim:
1. A process for the preparation of an article, comprising the following steps:
   (a) providing a component (i) which comprises a blend of
       (a1) at least 60 wt % of component (i) of an unsaturated first low density ethylene polymer having a total amount m1 of carbon-carbon double bonds/1000 carbon atoms of in the range of 0.2 to 2.0,
       (a2) and less than 10 wt % of component (i) of a crosslinking agent,
       (a3) optionally an unsaturated low molecular weight compound having a molecular weight of less than 1000 g/mole and a total amount m2 of carbon-carbon double bonds/1000 carbon atoms of >0,
       wherein the unsaturated first low density ethylene polymer (a1) has a total amount n1 of vinyl groups/1000 carbon atoms of at least 0.1 to 2,
   (b) providing separately a component (ii) in an amount of 5 to 35 wt % based on combined component (i) and (ii) amounts which comprises
       (b1) a second polymer having a total amount m3 of carbon-carbon double bonds/1000 carbon atoms of at least 0.3 to 2.0 which includes a total amount n2 of vinyl groups/1000 carbon atoms of from about 0.1 to 2.0, wherein the second polymer (b1) is a low density ethylene homopolymer;
       (b2) optionally an unsaturated low molecular weight compound having a molecular weight of less than 1000 g/mole and a total amount m4 of carbon-carbon double bonds/1000 carbon atoms of >0
       wherein m1, m2, m3, and m4 satisfy the following relationship:

$$2.0 \geq (m1+m2)-(m3+m4) \geq 0.2,$$

m2 and/or m4 being 0 if the unsaturated low molecular weight compound(s) (a3) and/or (b2) is/are not present, and the component (i) is different from component (ii); and
   (c) forming a blend of component (i) and component (ii) wherein the blend has a hot set elongation of about 30 to 85% and the permanent deformation is about −6 to −1.3%, and
   (d) forming an article comprising the blend obtained in step (c).

2. The process according to claim 1, the article being a layered article, wherein in step (d) one or more layers of the blend of step (c) are applied onto a substrate.

3. The process according to claim 1, wherein the unsaturated first low density ethylene polymer (a1) is different from the second polymer (b1).

4. The process according to claim 1, wherein the component (ii) does not comprise the unsaturated low molecular weight compound (b2) and therefore m4 is 0.

5. The process according to claim 1, wherein the unsaturated first low density ethylene polymer (a1) is prepared by copolymerising an ethylene monomer and at least one polyunsaturated comonomer.

6. The process according to claim 5, wherein the unsaturated first low density ethylene polymer (a1) has an amount k1 of vinyl groups/1000 carbon atoms which originate from the polyunsaturated comonomer, of at least 0.03.

7. The process according to claim 5, wherein the polyunsaturated comonomer is a diene.

8. The process according to claim 7, wherein the diene comprises at least eight carbon atoms, the first carbon-carbon double bond being terminal and the second carbon-carbon double bond being non-conjugated to the first one.

9. The process according to claim 8, wherein the diene is selected from the group consisting of 1,7-octadiene, 1,9-decadiene, 1,11-dodecadiene, 1,13-tetradecadiene, 7-methyl-1,6-octadiene, 9-methyl-1,8-decadiene, and any mixture thereof.

10. The process according to claim 1, wherein the unsaturated first low density ethylene polymer (a1) is prepared by high pressure by radical polymerisation.

11. The process according to claim 1, wherein the crosslinking agent in component (i) is present in an amount of 0.2 wt % to 10 wt %, based on the total weight of component (i).

12. The process according to claim 1, wherein the crosslinking agent is a peroxide.

13. The process according to claim 1, wherein the unsaturated low molecular weight compound (a3) is a compound containing at least one unsaturated group, including and aliphatic or aromatic compound, an ester, an ether, or a ketone containing at least one unsaturated group including a cyanurate, an isocyanurate, a phosphate, an ortho formate, an aliphatic ether, an aromatic ether, an allyl ester of benzene tricarboxylic acid, or any mixture thereof.

14. The process according to claim 1, wherein the unsaturated low molecular weight compound (a3) is present in an amount of less than 2 wt % based on the weight of component (i).

15. The process according to claim 1, wherein the component (i) further comprises a polar copolymer.

16. The process according to claim 15, wherein the polar copolymer has an amount of units derived from a polar comonomer of more than 150 micromoles of polar comonomer units per gram of polar copolymer.

17. The process according to claim 16, wherein the polar copolymer is an ethylene copolymer and the polar comonomer is selected from the group consisting of acrylates, methacrylates, vinyl acetate, and any mixture thereof.

18. The process according to claim 1, wherein the low density ethylene polymer is a linear low density polyethylene.

19. The process according to claim 1, wherein the component (ii) comprises a crosslinking agent in an amount of less than 5.0 wt % based on the weight of the component (ii).

20. The process according to claim 1, wherein the component (ii) does not comprise any crosslinking agent.

21. The process according to claim 1, wherein the component (i) and the component (ii) are blended in an extruder.

22. The process according to claim 1, wherein the component (i) and/or the component (ii) is/are provided in the form of pellets and the pellets are fed to the extruder.

23. The process according to claim 1, further in step (c), the blend is treated under crosslinking conditions.

24. The process according to claim 2, wherein the layered article is a power cable.

25. The process according to claim 1, wherein the component (ii) comprises a crosslinking agent in an amount of less than 2.0 wt % based on the weight of the component (ii).

26. A crosslinkable polymer composition, comprising a blend of two components (i) and (ii), wherein
   (a) component (i) comprises
       (a1) at least 60 wt % of component (i) of an unsaturated first low density ethylene polymer having a total amount m1 of carbon-carbon double bonds/1000 carbon atoms in the range of 0.2 to 2.0,
       (a2) and less than 10 wt % of component (i) of a crosslinking agent,
       (a3) optionally an unsaturated low molecular weight compound having a molecular weight of less than 1000 g/mole and a total amount m2 of carbon-carbon double bonds/1000 carbon atoms of >0, wherein the unsaturated first low density ethylene polymer (a1) has a total amount of n1 of vinyl groups/1000 carbon atoms of at least 0.1 to 2, and (b) component (ii) in an amount of 5 to 35 wt % based on combined components (i) and (ii) amounts, which comprises (b1) a second polymer having a total amount m3 of carbon-carbon double bonds/1000 carbon atoms of at least 0.3 to 2.0 which includes a total amount n2 of vinyl groups/1000 carbon atoms of from about 0.1 to 2.0, wherein the second polymer (b1) is a low density ethylene homopolymer;

(b2) optionally an unsaturated low molecular weight compound having a molecular weight of less than 1000 g/mole and a total amount m4 of carbon-carbon double bonds/1000 carbon atoms of >0, wherein m1, m2, m3 and m4 satisfy the following relationship:

$$2.0 \geq (m1+m2)-(m3+m4) \geq 0.2,$$

m2 and/or m4 being 0 if the unsaturated low molecular weight compound(s) (a3) and/or (b2) is/are not present, the component (i) is different from the component (ii); and wherein the composition has a hot set elongation of about 30 to 85% and the permanent deformation is about −6 to −1.3%.

27. A layered article comprising a blend of two components (i) and (ii) wherein:

(a) component (i) comprises (a1) at least 60 wt % of component (i) of an unsaturated first low density ethylene polymer having a total amount m1 of carbon-carbon double bonds/1000 carbon atoms of 0.2 to 2.0, (a2) and less than 10 wt % of component (i) of a crosslinking agent, (a3) optionally an unsaturated low molecular weight compound having a molecular weight of less than 1000 g/mole and a total amount m2 of carbon-carbon double bonds/1000 carbon atoms in the range of >0, wherein the unsaturated first low density ethylene polymer (a1) has a total amount n1 of vinyl groups/1000 carbon atoms of at least 0.1 to 2, (b) component (ii) in an amount of 5 to 35 wt % based on combined components (i) and (ii) amounts which comprises (b1) a second polymer having a total amount m3 of carbon-carbon double bonds/1000 carbon atoms of at least 0.3 to 2.0 which includes a total amount n2 of vinyl groups/1000 carbon atoms of from about 0.1 to 2.0, wherein the second polymer (b1) is a low density ethylene homopolymer;

(b2) optionally an unsaturated low molecular weight compound having a molecular weight of less than 1000 g/mole and a total amount m4 of carbon-carbon double bonds/1000 carbon atoms of >0 wherein m1, m2, m3, and m4 satisfy the following relationship:

$$2.0 \geq (m1+m2)-(m3+m4) \geq 0.2,$$

m2 and/or m4 being 0 if the unsaturated low molecular weight compound(s) (a3) and/or (b2) is/are not present, the component (i) is different the from component (ii); and wherein the blend has a hot set elongation of about 30 to 85% and the permanent deformation is about −6 to −1.3%.

* * * * *

UNITED STATES PATENT AND TRADEMARK OFFICE
CERTIFICATE OF CORRECTION

PATENT NO. : 8,802,780 B2 Page 1 of 1
APPLICATION NO. : 12/735226
DATED : August 12, 2014
INVENTOR(S) : Nigel Hampton and Annika Smedberg It is certified that error appears in the above-identified patent and that said Letters Patent is hereby corrected as shown below:

On the Title Page, Item (30), add --.1-- to "07124168"

In the Specification

Column 7, Line 22, "$MFR_{2.16/19°c}$" should be --$MFR_{2.16/190°c}$--

Column 21, Line 55, "MFR2" should be --$MFR_2$--

Column 22, Line 7, "MFR2" should be --$MFR_2$--

Column 22, Line 31, "MFR2" should be --$MFR_2$--

Column 22, Line 58, "MFR2" should be --$MFR_2$--

Signed and Sealed this
Twenty-first Day of April, 2015

Michelle K. Lee
*Director of the United States Patent and Trademark Office*